United States Patent [19]
Vasilakis et al.

[11] 3,726,633
[45] Apr. 10, 1973

[54] LOW POLLUTANT-HIGH THERMAL EFFICIENCY BURNER

[75] Inventors: Andrew D. Vasilakis, Bedford; Stanley P. Bonk, Burlington, both of Mass.

[73] Assignee: Thermo Electron Corporation, Waltham, Mass.

[22] Filed: Nov. 30, 1970

[21] Appl. No.: 93,603

[52] U.S. Cl. ............................................. 431/329
[51] Int. Cl. .......................................... F23d 13/14
[58] Field of Search ........................... 431/329, 100

[56] References Cited

UNITED STATES PATENTS

| | | | |
|---|---|---|---|
| 3,021,893 | 2/1962 | Honger | 431/329 |
| 3,107,720 | 10/1963 | Swinderen | 431/329 X |
| 3,233,653 | 2/1966 | Nakamura et al. | 431/329 |
| 3,502,116 | 3/1970 | Crawford | 139/425 A |
| 3,291,187 | 12/1966 | Haensel | 431/329 |
| 3,204,683 | 9/1965 | Ruff et al. | 431/329 X |
| 3,407,025 | 10/1968 | Hardison | 431/329 |

FOREIGN PATENTS OR APPLICATIONS

| | | | |
|---|---|---|---|
| 1,110,164 | 10/1955 | France | 431/329 |

Primary Examiner—Carroll B. Dority, Jr.
Attorney—Kenway, Jenney & Hildreth

[57] ABSTRACT

A liquid-fired burner in which the combustion space is defined by a cylinder which includes a screen heated by radiation from the combustion flame and by convection from the combustion gases flowing through the screen. The screen loses heat to the ambient volume principally by radiation and maintains an equilibrium temperature equal to or lower than the gases within the combustion space. Complete combustion with minimum excess air and low pressure drop is thus achieved resulting in operation at high thermal efficiency with minimal pollutant production. The radiant screen is so woven that very few optical paths exist from the interior combustion space to the ambient volume. Substantially all radiant energy originating in the combustion flames is intercepted by the screen, and the woven pattern serves also to enhance the transfer of heat to the screen from combustion gases passing therethrough. The screen may be made of an oxidation-resistant alloy or may in some instances be coated with high temperature ceramic.

10 Claims, 3 Drawing Figures

LOW POLLUTANT-HIGH THERMAL EFFICIENCY BURNER

BACKGROUND OF THE INVENTION

The need for pollution control is now so universally recognized as to require no further elaboration. A substantial contribution to pollution is made by domestic and industrial heating system, and a vast amount of effort is being expended to reduce the emission of pollutants into the atmosphere. Much of the effort has been concentrated on remedies which are operative after the generation of the pollutant material. Items such as precipitators are commonplace in the stacks or flues of heating systems as are various other chemical and mechanical scrubbing devices. Such systems are successful to a degree, but they do constitute an additional expense for their installation and, generally, further expense for their upkeep. In some instances, material recovery systems permit some of the expense to be offset, but it is obvious that it would be far more advantageous to avoid the creation of the pollutants in the first place.

The avoidance approach has not been ignored, but it has often involved nothing more than a choice of "cleaner" fuels. Markedly improved results have been achieved, but the supply of such "cleaner" fuels is limited, and they tend to be expensive, which militates against their wider use.

SUMMARY OF THE INVENTION

In the present invention, the approach is different from those noted above in that no special fuels or after-the-fact remedies are contemplated. Rather, more complete combustion reduces the generation of pollutants, and a surprising increase in thermal efficiency accompanies that reduction. In a practical system embodying the invention, fuel is supplied to a burner through a conventional atomizing nozzle, and air for combustion may be provided about the atomizing nozzle. Various aids to mixing such as swirl passages may be used to insure that the fuel mix is capable of immediate ignition and complete combustion. The burner is preferably mounted centrally of an end plate formed of a disc of ceramic material such as castable firebrick, and the flame is directed through the center of the end plate into a cylindrical volume, the length of the cylinder being composed of a radiant screen, and the other end plate of the cylinder being formed from a plane disc of castable firebrick. The screen may be made of Inconel, Nichrome 5, silicon carbide fibers or other high-temperature oxidation-resistant material and may, if desired, be coated with a high-temperature ceramic such as alumina. The pattern of the weave of the screen is such that very few radial openings are formed through the cylindrical screen. Certain weaves which satisfy these requirements are manufactured by Michigan Wire Cloth, a division of Michigan-Dynamics, Inc., 2100 Howard Street, Detroit, Michigan 48216.

With such structure, the screen derives heat not only by convection from the combustion gases which pass through the screen but also from the radiation from the combustion flame and, further, the screen serves to contain combustion entirely within the cylindrical chamber. Combustion is essentially complete with little excess air, and the production of pollutants is minimal while thermal efficiency is high. For a better understanding of the present invention together with other features and advantages, references should be made to the following drawing, the single figure of which is a view of a preferred embodiment of the burner.

DESCRIPTION OF PREFERRED EMBODIMENT

Figure 1:
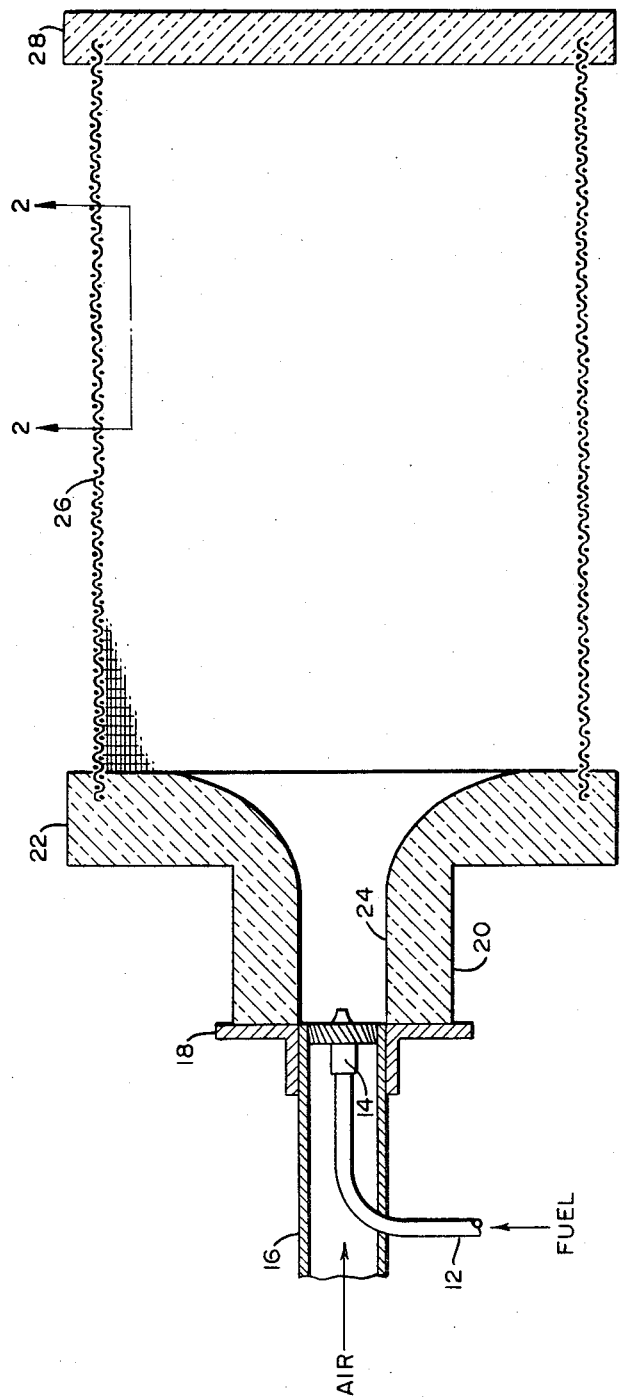
FIG. 1 is a cross-sectional view illustrating a preferred embodiment of this invention.

In FIG. 1, there may be seen an inlet line 12 which is connected to a nozzle 14 to introduce fuel. The fuel may be any of the conventional liquid types used for heating, the system having been operated successfully with a wide range of fuels. Surrounding the nozzle 14 is a tube 16 through which air is introduced. The nozzle 14 is preferably of the atomizing type, and the tube 16 may contain swirl passages to enhance the mixing of air with the atomized fuel.

A disc 18, having a central opening, may serve as the mount for the inlet elements and burner. The disc 18 is attached by any suitable means to a boss 20 which may be integral with a flange 22 made of castable ceramic such as a castable firebrick. A central opening 24 communicating with the opening in the disc 18 passes through the boss and flares into a larger opening on the interior side of the flange 22.

Connected to the flange 22, and preferably without the use of any intervening metal, is a cylindrical screen 26. The screen 26 is similarly connected at its further end to an end plate 28, also of ceramic such as the castable firebrick. In fact, it is desirable that the screen 22 be cast with the end members 22 and 28 to avoid the use of any connectors and to eliminate any joints.

Figure 2:
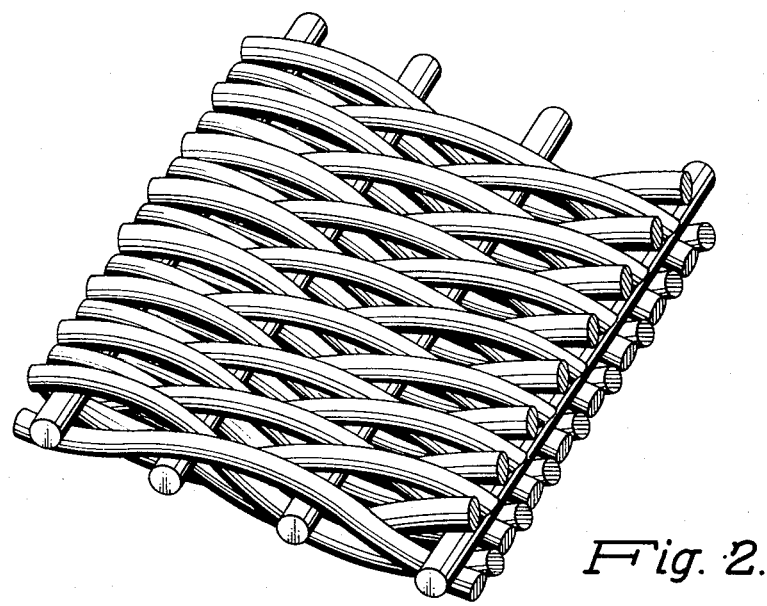
FIG. 2 is a perspective view taken along line 2—2 of FIG. 1 illustrating one example of an element of FIG. 1.
Figure 3:
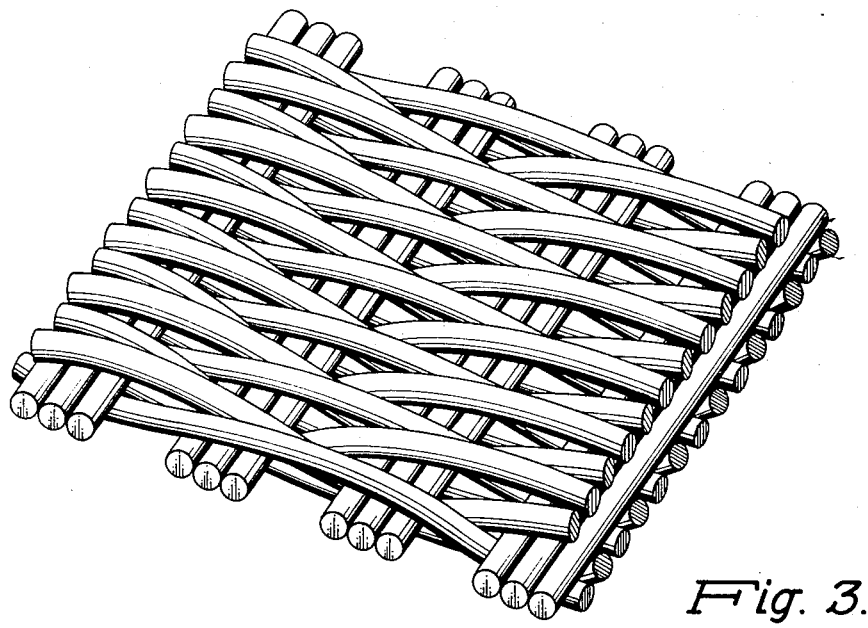
FIG. 3 is a perspective view taken along line 2—2 of FIG. 1 illustrating another example of the element shown in FIG. 2.

As noted above, the screen 26 is of a weave, the pattern of which includes substantially no direct radial openings. Stated otherwise, few optical paths through the screen exist. In a typical screen, the weave is made up of 0.0045 inch diameter wire of a mesh such as 50 × 250. The length of the screen is not critical nor is the cylindrical diameter. However, with a diameter of 7 inches and a length of 9.5 inches, more than 100,000 Btu/hr. of heat generation has been attained. With the same diameter and a length of 12.5 inches, approximately 140,000 Btu/hr. of heat generation has been reached at a pressure drop of 0.6 inch to 0.8 inch of water. Insofar as the pattern of the weave is concerned, it has previously been mentioned that Michigan Wire Cloth manufactures suitable weaves. Two such weaves are illustrated in FIGS. 2 and 3. These, however, are shown by way of example and other weaves wherein optical paths through the screen are minimized are also feasible.

In operation, fuel and air are fed in a conventional manner to the nozzle 14 and the tube 16 respectively. The fuel mix may be ignited conventionally by use of a spark plug or other ignitor. The flame which is created is confined entirely within the cylindrical volume, and the screen 26 is heated at least in part by the radiant energy originating in the flame. The same characteristics of the screen pattern which cause all radiant energy to be intercepted by the screen also serve to extract from the combustion gases passing through the screen much of the heat contained in those gases. In other words, heat transfer by radiation and convection, both at high efficiency, occurs.

The screen loses heat primarily by radiation, and it reaches an equilibrium temperature of 1,600° to 2,500° Fahrenheit which is generally equal to or slightly less than the temperature of the gases within the volume. Combustion within the volume is essentially complete. Approximately 40 to 50 percent of the fuel imput is converted to radiant heat flux.

At the low end of the operating temperature range, the screen may be composed simply of oxidation-resistant alloys such as those noted above, but at high temperatures the life of the screen may be prolonged by ceramic coatings. These coatings may be applied by dipping, spraying or by vapor or chemical deposition. Actually, the ceramic coatings may be used not only to extend the operating temperature range, but they may also be used to permit the use of low-cost materials in the basic screen rather than the specific oxidation-resistant alloys mentioned.

The screen has very low thermal inertia which means that the efficiency of the system is maintained at a high level during start-up and during changes in firing rate. Regarding the startup characteristics, the metal of the screen is such that it reaches its equilibrium temperature very quickly, minimizing quenching of unburned fuel by cold surfaces which could detract from complete combustion. A further feature of the screen is its ability to ignite within the volume any unburned hydrocarbons escaping combustion at the center of the volume. The screen operates at temperatures below those conducive to $(NO)_x$ production but high enough to burn any traces of unburned hydrocarbons leaving the liner 24 thus enabling operation at lower emission levels.

We claim:

1. In a heating system which includes a burner and means for supplying a combustible mixture thereto, a combustion chamber and radiant heat exchanger comprising a cylinder having end plates of insulating material and a central portion composed of a screen, said burner penetrating one of said end plates, combustion of said fuel mixture taking place within said cylinder to produce flame and combustion gases therein, said screen being woven in a pattern such that radial openings which establish direct optical paths for radiant energy produced by said combustion are substantially eliminated, whereby combustion is limited to the volume defined by said cylinder and said screen is heated to radiance by substantially all radiation from said flame and by convection from said combustion gases passing therethrough.

2. In a heating system as defined in claim 1, the combination wherein said screen is coated with high-temperature ceramic.

3. In a heating system as defined in claim 1, the combination wherein said end plates are of castable ceramic material, said material being cast with said screen to form an integral connection therewith.

4. In a heating system as defined in claim 2, the combination wherein said high-temperature ceramic is alumina.

5. In a heating system as defined in claim 1, the combination wherein said end plates are formed of castable firebrick.

6. In a heating system as defined in claim 1, the combination wherein said screen is one of the group comprising Inconel, Nichrome and silicon carbide.

7. A combination combustion chamber and radiant heat exchanger comprising an enclosure for receiving a combustible mixture and means for admitting said combustible mixture to said enclosure, said enclosure comprising:
   a. an insulating portion at least immediately adjacent said admitting means; and
   b. a porous screen defining the bounds of said enclosure and woven in a pattern substantially eliminating direct optical paths from within said enclosure to the exterior thereof for containing substantially all combustion internal of said enclosure, whereby substantially all radiant energy produced by such combustion is intercepted by said screen.

8. A combustion chamber and radiant heat exchanger according to claim 7 wherein said screen is coated with a high temperature ceramic.

9. A combustion chamber and radiant heat exchanger according to claim 8 wherein said high temperature ceramic is alumina.

10. A combustion chamber and radiant heat exchanger according to claim 7 wherein said insulating portion comprises insulating material cast with said screen to form an integral connection therewith.

* * * * *